US010108747B2

(12) United States Patent
Lu (10) Patent No.: US 10,108,747 B2
(45) Date of Patent: Oct. 23, 2018

(54) GENERATING NETWORK RESOURCE

(71) Applicant: Alibaba Group Holding Limited, Grand Cayman (KY)

(72) Inventor: Shali Lu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 271 days.

(21) Appl. No.: 14/932,715

(22) Filed: Nov. 4, 2015

(65) Prior Publication Data

US 2016/0127258 A1    May 5, 2016

(30) Foreign Application Priority Data

Nov. 4, 2014 (CN) .......................... 2014 1 0614011

(51) Int. Cl.
*H04L 12/911* (2013.01)
*G06F 17/30* (2006.01)
*H04L 29/08* (2006.01)

(52) U.S. Cl.
CPC ...... *G06F 17/30964* (2013.01); *H04L 47/788* (2013.01); *H04L 67/02* (2013.01)

(58) Field of Classification Search
CPC .. H04L 67/02; H04L 47/788; G06F 17/30964
See application file for complete search history.

(56) References Cited

U.S. PATENT DOCUMENTS

| 7,324,989 | B2 | 1/2008 | Silverbrook et al. |
| 7,571,208 | B2 * | 8/2009 | Syed ....................... H04L 67/02 |
| | | | 709/203 |
| 7,571,222 | B1 * | 8/2009 | Evans ...................... H04L 41/12 |
| | | | 709/220 |
| 7,885,862 | B1 | 2/2011 | Vincent et al. |
| 8,315,998 | B1 | 11/2012 | Dean |
| 2005/0240651 | A1 * | 10/2005 | Govindarajan ......... G06F 9/465 |
| | | | 709/200 |
| 2008/0244236 | A1 * | 10/2008 | Feblowitz ............... H04L 65/60 |
| | | | 712/220 |
| 2009/0013066 | A1 | 1/2009 | Pecus |
| 2011/0246461 | A1 | 10/2011 | Jung et al. |

(Continued)

FOREIGN PATENT DOCUMENTS

CN              103870979 A       6/2014

OTHER PUBLICATIONS

PCT Search Report and Written Opinion dated Mar. 2, 2016 for PCT Application No. PCT/US15/59056, 7 pages.

(Continued)

*Primary Examiner* — Oanh Duong
(74) *Attorney, Agent, or Firm* — Lee & Hayes, PLLC (57) ABSTRACT

The techniques of the present disclosure acquire requirement description information of a user, acquire at least one resource component according to the requirement description information, the resource component being a component that constitutes a network resource desired by the user, or a function component for realizing a part of functions of the network resource; and assemble the network resource according to the at least one resource component. The techniques of the present disclosure enhance a matching degree between the network resource and the user's requirement, thereby meeting the requirement of the user with respect to the network resource.

20 Claims, 6 Drawing Sheets

(56) References Cited

U.S. PATENT DOCUMENTS

| | | | |
|---|---|---|---|
| 2011/0255518 | A9 | 10/2011 | Agrawal et al. |
| 2012/0059723 | A1 | 3/2012 | Wiesinger et al. |
| 2012/0173385 | A1* | 7/2012 | Fan .................. G06Q 30/0613 |
| | | | 705/26.41 |
| 2013/0198359 | A1 | 8/2013 | Gill et al. |
| 2014/0006602 | A1 | 1/2014 | Assuncao et al. |
| 2014/0033901 | A1* | 2/2014 | Moin ...................... G10H 1/36 |
| | | | 84/610 |
| 2014/0172581 | A1* | 6/2014 | Wiesinger .......... G06Q 30/0269 |
| | | | 705/14.66 |
| 2015/0039581 | A1 | 2/2015 | John et al. |
| 2015/0229718 | A1* | 8/2015 | Galloway ............... G06F 3/048 |
| | | | 709/203 |
| 2015/0339754 | A1* | 11/2015 | Bloem .............. G06F 17/30867 |
| | | | 705/26.7 |
| 2015/0371180 | A1* | 12/2015 | Matsuura ................ G06F 17/30 |
| | | | 707/691 |
| 2016/0048730 | A1* | 2/2016 | Ishiyama ........... G06K 9/00577 |
| | | | 382/108 |
| 2016/0125035 | A1* | 5/2016 | Hanson ............. G06F 17/30699 |
| | | | 707/722 |

OTHER PUBLICATIONS

Extended European Search Report dated Apr. 5, 2018 for European Patent Application No. 15856746.1, 9 pages.
Machine translation of Chinese Office Action dated May 28, 2018 for Chinese patent application No. 201410614011.9, a counterpart foreign application fo U.S. Appl. No. 14/932,715, 8 pages.
CN search report, CN application No. 201410614011.9, dated May 16, 2018, 2 pages.

\* cited by examiner

GENERATING NETWORK RESOURCE

CROSS REFERENCE TO RELATED PATENT APPLICATION

This application claims foreign priority to Chinese Patent Application No. 201410614011.9 filed on 4 Nov. 2014 entitled "Method and Apparatus for Generating Network Resources", which is hereby incorporated by reference in its entirety.

TECHNICAL FIELD

The present disclosure relates to the field of Internet technology, and, more particularly, to a method and apparatus for generating network resources.

BACKGROUND

With the continuous development of computer technology, the Internet is more and more widely used, and users obtain access to required network resources through the Internet. For example, a user enters a keyword; a search engine searches in a database by using the keyword according to a certain matching strategy, and provides the network resource matching the keyword to the user.

In the aforementioned method, although the network resource returned by the search engine matches with the keyword entered by the user, a matching degree with the user's requirement may be low, and the user's requirements cannot be met.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Multiple aspects of the present disclosure provide a method and apparatus for generating network resource to enhance a matching degree between a network resource and a user's requirement, thereby meeting the user's requirement.

One aspect of the present disclosure provides a network resource generating method, which includes the following operations:

acquiring requirement description information of a user;

acquiring at least one resource component according to the requirement description information, the resource component being a component that constitutes a network resource desired by the user, or a function component for realizing a part of functions of the network resource; and assembling the network resource according to the at least one resource component.

Another aspect of the present disclosure provides a network resource generating apparatus, which includes:

a first acquiring module that acquires requirement description information of a user;

a second acquiring module that acquires at least one resource component according to the requirement description information, the resource component being a component that constitutes a network resource desired by the user, or a function component for realizing a part of functions of the network resource; and an assembling module that assembles the network resource according to the at least one resource component.

In the present disclosure, the network resource generating apparatus acquires the requirement description information of the user, acquires the at least one resource component that constitutes or realizes the network resource desired by the user according to the requirement description information, and assembles the network resource desired by the user according to the at least one resource component, achieves an objective of customizing the network resource for the user according to the user's requirement, so that the assembled network resource meets the user's requirement better, and has a higher matching degree with the user's requirement, thereby better meeting the requirement of the user for the network resource.

BRIEF DESCRIPTION OF THE DRAWINGS

To describe the technical solutions in the embodiments of the present disclosure more clearly, the following briefly introduces the accompanying drawings required for describing the example embodiments. Apparently, the accompanying drawings in the following description merely represent some of the embodiments of the present disclosure, and a person of ordinary skill in the art may still derive other drawings from these accompanying drawings without creative efforts.

DETAILED DESCRIPTION

To make the objectives, technical solutions and advantages of the present disclosure clear, the technical solutions in the example embodiments of the present disclosure are described with reference to the accompanying drawings in the example embodiments of the present disclosure. Apparently, the example embodiments in the following description represent merely a part of embodiments of the present disclosure, and not all of the embodiments. Based on the example embodiments in the present disclosure, all other embodiments derived by a person of ordinary skill in the art without using creative efforts shall fall within the protection scope of the present disclosure.

Figure 1:
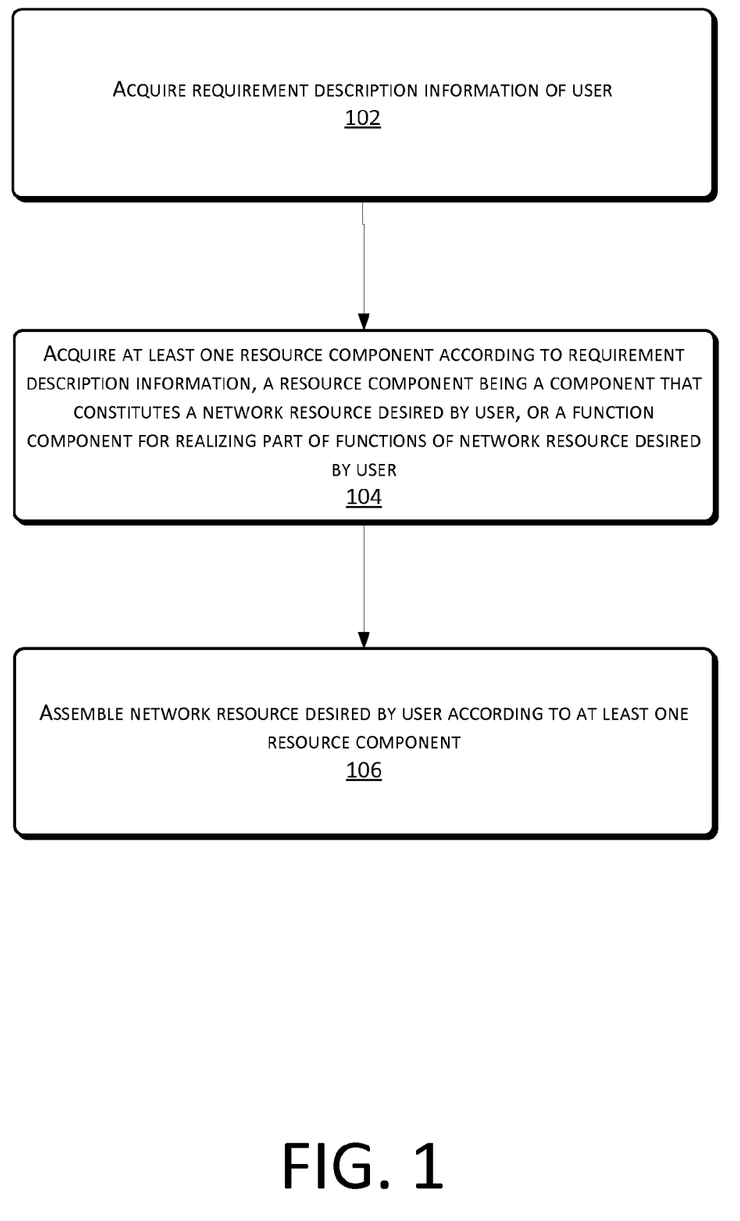
FIG. 1 is a schematic flowchart of an example network resource generating method according to an example embodiment the present disclosure.

FIG. 1 is a schematic flowchart of an example network resource generating method according to an example embodiment of the present disclosure. As shown in FIG. 1, the method includes the following operations.

At 102, requirement description information of a user is acquired.

At 104, at least one resource component is acquired according to the above requirement description information. The resource component is a component that constitutes a network resource desired by the user, or a function component for realizing a part of functions of the network resource.

At 106, the network resource desired by the user is assembled according to the at least one resource component.

This example embodiment provides a network resource generating method, which may be executed by a network resource generating apparatus. The network resource generating apparatus may be a variety of search engines for providing the network resource to the user according to the user's requirement, for example, a general purpose search engine, or search engines provided by various application systems, such as a shopping application system, a financial application system, etc.

In this example embodiment, the requirement description information of the user describes the network resource desired by the user. The requirement description information may be implemented in various forms, for example, one or more keywords, a sentence, or even a list of information. Compared with the keyword in the conventional techniques, the requirement description information of this embodiment has a wider meaning, and is implemented in a more flexible manner.

The network resource in this example embodiment is a network resource in general meaning. Information, data, or objects obtained through the Internet all belong to the network resource mentioned in this example embodiment. For example, an answer to a question on the Internet belongs to the network resource, the information of a commodity on the Internet belongs to the network resource, registration information of a certain user on the Internet belongs to the network resource, a video resource on the Internet belongs to the network resource, and a certain service provided by the Internet also belongs to the network resource, etc.

For example, financial products provided by various financial applications belong to the network resource. If the user expects the financial application to provide a financial product customized in accordance with individual characteristics of the user, the customized financial product also belongs to the network resource. The commodity or service information provided by various shopping websites belongs to the network resource, and if the user desires the shopping website to provide a commodity customized in accordance with the individual characteristics of the user, such as clothes having a special pattern or a special material, the customized commodity also belongs to the network resource.

When the user desires to have access to a certain network resource, the desired network resource may be described through the requirement description information, and the requirement description information will be provided to the network resource generating apparatus, so that the network resource generating apparatus generates the desired network resource for the user according to the requirement description information. For example, the network resource generating apparatus may provide an interactive interface to the user, and the user provides the requirement description information to the network resource generating apparatus via the interactive interface. Alternatively, the user may send an acquiring request or a querying request to the network resource generating apparatus via a client terminal of the user, and carry the requirement description information in the acquiring request or the querying request, such that the network resource generating apparatus receives the acquiring request or the querying request sent by the client of the user and acquires the requirement description information from the acquiring request or the querying request.

The network resource generating apparatus, after acquiring the requirement description information of the user, acquires at least one resource component according to the requirement description information. The resource component is a component that constitutes a network resource desired by the user, or a function component for realizing a part of functions of the network resource desired by the user, depending upon the specific type of the network resource. Therefore, the network resource generating apparatus, after acquiring the at least one resource component, may assemble the network resource desired by the user according to the at least one resource component. For example, the apparatus may determine a component template matching these resource components according to the at least one resource component, and assemble the resource components together in accordance with the component template to form the network resource. The component template defines an assembling relationship between the resource components.

It should be noted that at least one resource component may correspond to a component template, or correspond to two or more component templates. When corresponding to two or more component templates, the resource component corresponding to each of the component templates is not exactly the same. In addition, when corresponding to two or more component templates, the at least one resource component may be assembled into two or more network resources, and these network resources meet the user's requirement theoretically, i.e., the network resource desired by the user.

In view of the above description, this example embodiment may identify the requirement of the user according to the requirement description information of the user, and further customize the network resource desired by the user according to the user's requirements, such that the assembled network resource complies better with the user's requirement and has a higher matching degree with the user's requirement, thus better meet the user's requirement. In addition, the network resources customized by the techniques in this example embodiment has a relatively small number, thereby reducing the processing burden of the network resource generating apparatus and improving the efficiency of acquiring the network resource by the user as compared with the search engine in the prior art.

The network resource, the resource component, and the relationship between them in the example embodiments of the present disclosure are illustrated below with examples.

If the network resource desired by the user is a physical entity, such as a commodity, the resource component acquired according to the requirement description information of the user is a certain component that constitutes the entity. For example, the user desires to acquire a cup with a cup lid and a cup body having a special pattern, and the network resource generating apparatus may acquire two resource components, i.e., the cup lid and the cup body, according to the requirement description information of the user. That is, the cup lid may serve as a resource component, and the cup body may also serve as a resource component, and the two resource components are both components that constitute the cup desired by the user. For another example, the user desires a rotatable and removable chair, so that the network resource generating apparatus acquires a plurality of resource components including a headrest, a back, a seat, an armrest, a support bar (gas bar), a hinge, a five-claw, a claw wheel, and screws for fixing of the chair, and these resource components are all components for constituting the rotatable chair.

If the network resource desired by the user belongs to a non-physical or virtual entity network resource, such as an application having at least N sub-functions (N may be any integer), the network resource generating apparatus may acquire each sub-function according to the requirement description information of the user to serve as a function component of the application. For another example, the network resource desired by the user may be a customized financial product required for capital preservation, such as having a benefit greater than 6%, and a financial cycle less than 5 years, so that the network resource generating apparatus may acquire an insurance product (for meeting the needs of capital preservation) and a medium or short term enterprise loan product (for meeting the needs of the interest rate and the financing cycle) according to the requirement description information of the user, to serve as the resource components of the customized financial product.

Figure 2:
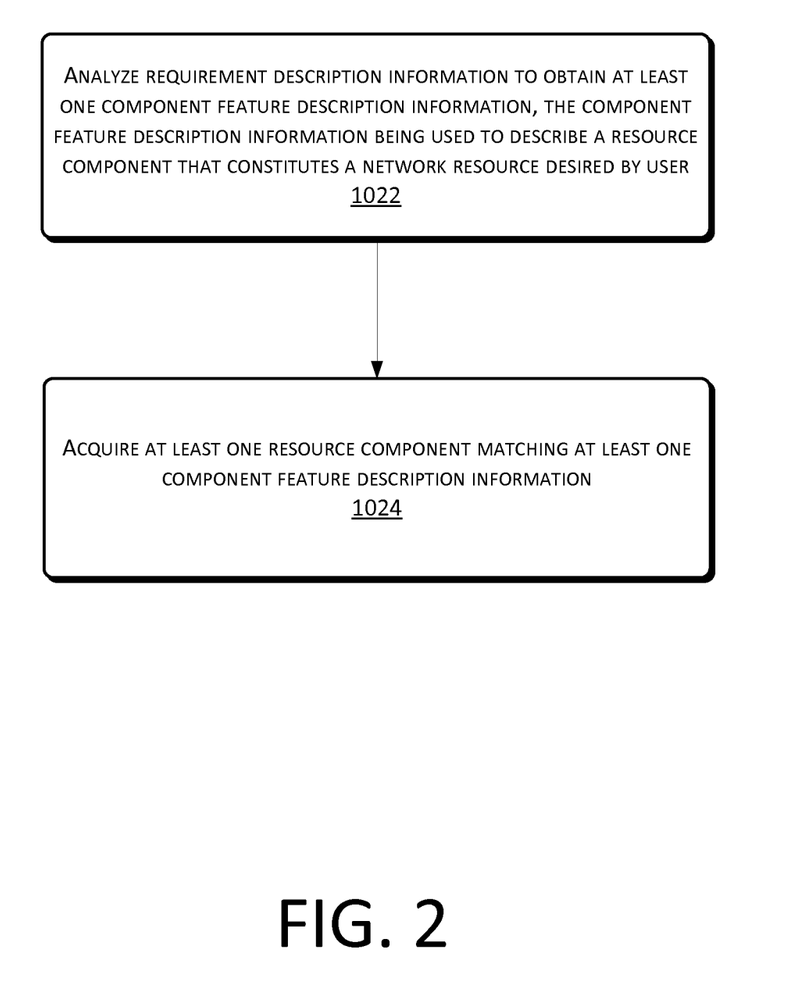
FIG. 2 is a schematic flowchart of an example implementation of operation 104 according to an example embodiment the present disclosure.

In an optional implementation, as shown in FIG. 2, one implementing process of the above operations at 104 includes:

At 1022, the requirement description information is analyzed to obtain at least one component feature description information. The component feature description information describes the resource component that constitutes the network resource desired by the user.

At 1024, the at least one resource component matching the at least one component feature description information is acquired.

The techniques of the example embodiment analyze the requirement description information of the user to obtain the component feature description information, and further acquire the resource component matching the component feature description information, which are equivalent to automatically identifying the user's requirement, further acquire the resource component meeting the user's requirement, and finally assemble these components into the network resource desired by the user, thereby achieving the purpose of customizing the network resource for the user, and meeting the user's requirement.

It should be noted that, one piece component feature description information may correspond to one or more resource components. For example, if the user needs a one-year financial product having an interest rate of 6% and required for capital preservation, the requirement description information may be described as: a loan product, interest rate of 6% and being insured by an insurance company, or a bank financial product having a guaranteed benefit of 6%. The network resource generating apparatus analyzes the requirement description information to obtain the component feature description information described below: an interest bearing component: a contracted interest rate>=6% and a cycle<=1 year; or an interest bearing component having a cycle<=1 year, and a benefit insurance component having a lowest interest rate of 6% insured by an insurance company.

In an optional embodiment, a component library may be provided to store a variety of resource components and a component element corresponding to each of the resource components. The component element describes the resource component corresponding to the component element.

Based on the above component library, the implementation of the operation at 1024 includes: performing matching in the component library according to at least one piece component feature description information; if each piece component feature description information in the at least one piece component feature description information is matched to the corresponding component element, acquiring the resource component corresponding to the component element corresponding to each piece component feature description information from the component library; if component feature description information which is not matched to the corresponding component element exists among the at least one piece component feature description information, sending the requirement description information and/or the at least one piece component feature description information to a resource generating platform so that the resource generating platform generates the at least one resource component according to the requirement description information and/or the at least one piece component feature description information, and receiving the at least one resource component returned by the resource generating platform.

It should be noted that, although the component feature description information and the component element both describe the resource component, as the component feature description information is obtained by analyzing the requirement description information of the user, it usually has some differences from the component element of the resource component. Therefore, in the above matching process, one piece component feature description information may not be matched to the component element, may be matched to one component element, or may be matched to two or more component elements.

In the above embodiment, each piece component feature description information is matched to the corresponding component element indicates that the resource components required for assembling the network resource desired by the user are obtained, which means that the resource component corresponding to the matched component element is assembled into the network resource desired by the user. A part of the component feature description information cannot be matched to the corresponding component element indicates that not all of the resource components required for assembling the network resource desired by the user are obtained, which means that the network resource desired by the user cannot be assembled. In the case that the network resource desired by the user cannot be assembled, in order to provide the user with the network resource, the network resource generating apparatus provides the requirement description information of the user and/or the at least one piece component feature description information analyzed from the requirement description information to the resource generating platform. The resource generating platform produces the at least one resource component according to the requirement description information of the user and/or the at least one piece component feature description information analyzed from the requirement description information and returns them to the network resource generating apparatus, such that the network resource generating apparatus may assemble the network resource desired by the user according to these resource components.

The resource generating platform may be a producing platform provided by various resource component providers, for example, a cup lid producing platform provided by a cup lid provider, a financial product releasing platform provided by a financial product provider, or a clothes production line or clothing processing platform provided by a clothes provider, and so on.

Further, optionally, the network resource generating apparatus may add the resource component, provided by the resource generating platform, which does not exist among the component library, into the component library.

Further, optionally, in some traditional industries, such as a provider of cup lids in special colors, when there is a need to produce the cup lips in special colors, corresponding production lines or devices need to be purchased first, and if there is not a large volume in demand, the input-output ratio of the provider is very low, or even a deficit is generated. With respect to such problem, when the network resource desired by the user cannot be assembled, the network resource generating apparatus may store the requirement description information and/or the at least one component feature description information analyzed from the requirement description information into a requirement pool, and then send them to the resource generating platform after the number of the same requirement in the requirement pool reaches a threshold, thereby enhancing the input-output ratio of the resource generating platform. This implementing is mainly applicable in some traditional industries. With respect to certain services such as the Internet service, the marginal cost is almost 0, so that as long as there is requirement, the network resource generating apparatus may provide the requirement description information of the user and/or the at least one piece component feature description information analyzed from the requirement description information to the resource generating platform of corresponding provider, thereby shortening the time for the user to acquire the network resource and enhancing the efficiency for the user to acquire the network resource desired.

Figure 3:
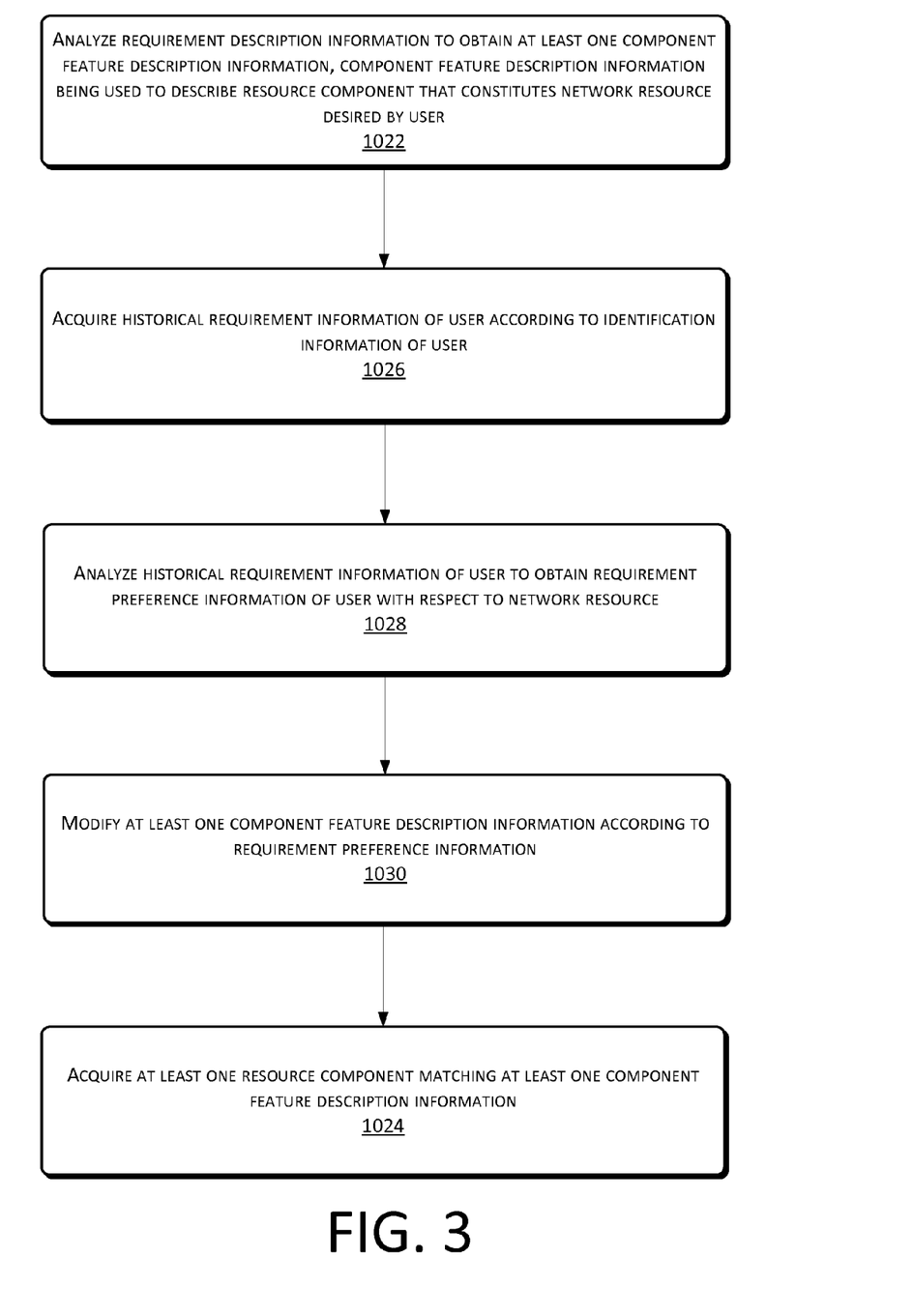
FIG. 3 is a schematic flowchart of another example implementation of operation 104 according to another example embodiment the present disclosure.

In an optional implementing, FIG. 3 shows another example implementing of the above operation at 104, which may be implemented on the basis of the implementing manner shown in FIG. 2, and specifically further includes the following operations before 1024.

At 1026, historical requirement information of the user is acquired according to identification information of the user.

At 1028, the historical requirement information of the user is analyzed to obtain requirement preference information of the user with respect to the network resource.

At 1030, the at least one component feature description information is modified according to the requirement preference information.

In this implementing, by taking into account the historical requirement information of the user, the requirement preference of the user (that is, the network resource desired this time) is analyzed according to the historical requirement information of the user, and the component feature description information analyzed from the requirement description information of the user is further modified according to the requirement preference. The aforementioned modification mainly includes adding new component feature description information, adjusting a hierarchical relationship between the component feature description information, and/or tuning the component feature description information, and so on.

For example, assuming that the user requires a one-year financial product having an interest rate of 6%, the requirement description information may be expressed as: a loan product having an interest rate of 6%, or a bank financial product having a benefit of 6%. The component feature description information analyzed from the requirement description information may be expressed as: an interest bearing component having an interest rate>=6% and a cycle<=1 year; the historical requirement information of the user may be the investment of the user on a monetary fund such as the Yu' E Bao. The requirement preference of the user analyzed according to the historical requirement information of the user is that: the user is a conservative investment user. Based on the requirement preference, the component feature description information is modified to obtain modified component feature description information, which may be expressed as: an interest bearing component having an interest rate>=6%, a cycle<=1 year, and a product type being conservative.

Based on the above, the operation at 1024 performs matching according to the modified component feature description information to acquire the at least one resource component matching the modified component feature description information.

In this example embodiment, the network resource generating apparatus performs modification of the component feature description information according to the requirement preference of the user, such that the modified component feature description information complies better with this requirement of the user, and further the network resource assembled by the matched resource component complies better with the requirement of the user.

Figure 4:
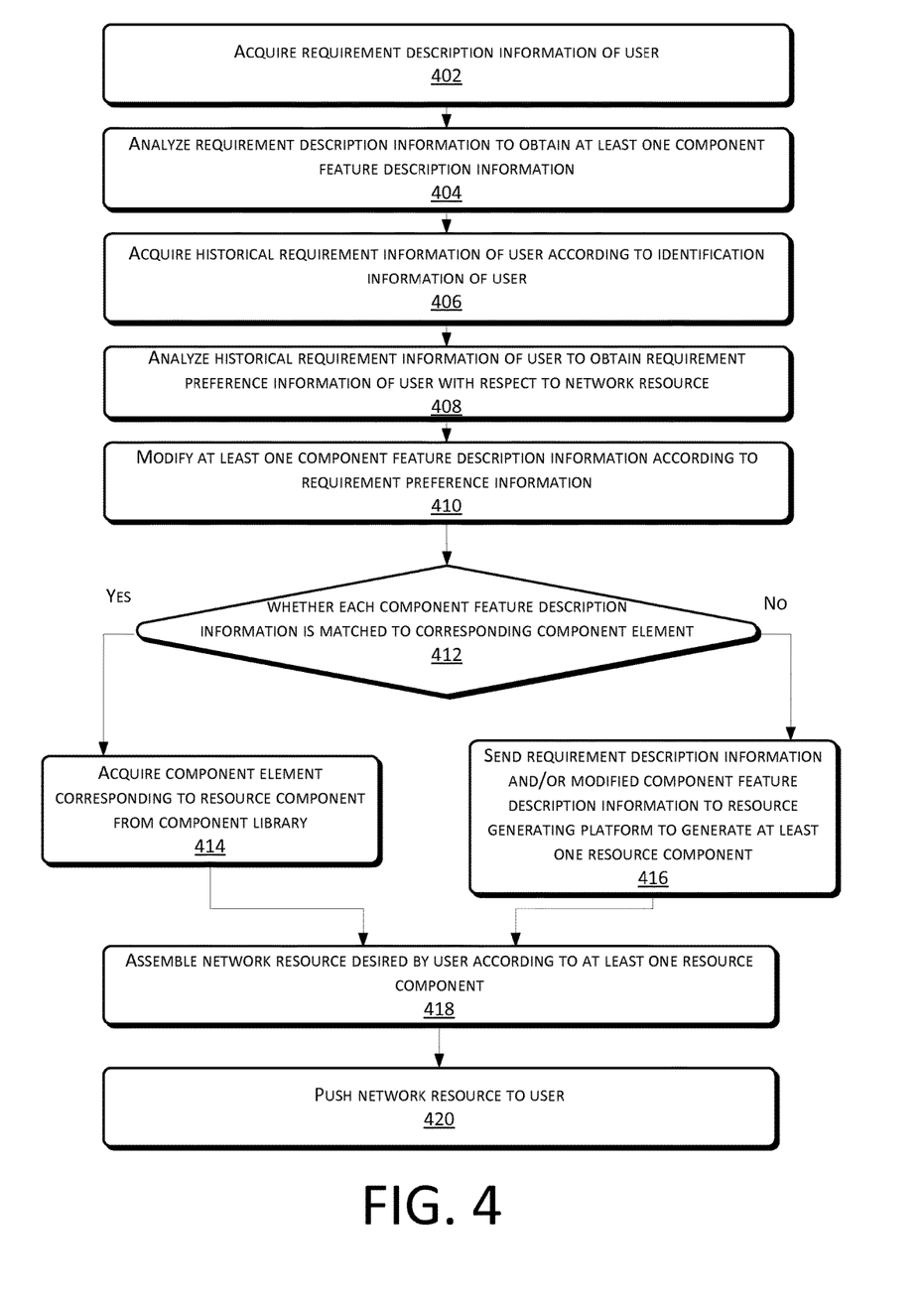
FIG. 4 is a schematic flowchart of an example network resource generating method according to another embodiment of the present disclosure.

FIG. 4 is a schematic flowchart of an example network resource generating method according to another example embodiment of the present disclosure. As shown in FIG. 4, the method includes:

At 402, requirement description information of a user is acquired.

At 404, the requirement description information is analyzed to obtain at least one component feature description information. The component feature description information describes the resource component that constitutes the network resource desired by the user.

At 406, historical requirement information of the user is acquired according to identification information of the user.

At 408, the historical requirement information of the user is analyzed to obtain requirement preference information of the user with respect to the network resource.

At 410, the at least one component feature description information is modified according to the requirement preference information.

At 412, a matching is performed in the component library according to the modified component feature description information, and whether each piece component feature description information among the at least one component feature description information is matched to the corresponding component element is determined. If a determining result is positive, operations at 414 are performed; otherwise operations at 416 are performed.

At 414 the component element corresponding to the resource component, which corresponds to each piece component feature description information, is acquired from the component library, and operations at 418 are performed.

At 416, the requirement description information and/or the modified component feature description information is sent to a resource generating platform so that the resource generating platform generates the at least one resource component according to requirement description information and/or the modified component feature description information. The at least one resource component returned by the resource generating platform is received, and operations at 418 are performed.

At 418, the network resource desired by the user is assembled according to the above at least one resource component.

At 420, the network resource is pushed to the user.

The above operations from 402 to 420 may refer to the descriptions of the previous example embodiment, and are not detailed herein.

In this example embodiment, the network resource generating apparatus, after assembling the network resource desired by the user, pushes the network resource to the user. For example, the network resource generating apparatus may display the network resource on an interface of the network resource generating apparatus, or display the network resource to the user via a client terminal of the user.

In an optional implementing, the network resource generating apparatus may push the network resource to the user when the matching degree between features of the network resource and the requirement description information of the user is greater than a preset matching degree threshold.

If the network resource generating apparatus assembles a plurality of network resources, the network resource generating apparatus may push to the user the network resource, among the plurality of network resource, with features having the matching degree with the requirement description information greater than the preset matching degree threshold.

Further, the user may also return information such as satisfaction degree or opinions on the network resource pushed by the network resource generating apparatus to the network resource generating apparatus. The network resource generating apparatus receives the information such as satisfaction degree or opinions feedback from the user, and uses such information as the information of the current-time requirement of the user, to realize the accumulation of the historical requirement information of the user, thereby subsequently forming the habit preference of the user.

The techniques of this example embodiment, by pushing the network resource having a higher matching degree with the requirement description information of the user to the user, may further enhance the matching degree of the network resource pushed to the user with the user's requirement, thereby further meeting the requirement of the user on the network resource. In addition, considering that different users have different requirements, and every user has his/her own unique requirement, the method provided in this example embodiment may push the network resource that complies with each user's requirement or unique requirement to the user with respect to the different requirements of the different users and the unique requirements of the different users. Furthermore, the method provided in this example embodiment may contribute to a new e-commerce model, i.e., different providers may publish their own resources to the component library as the resource component for the users to customize the desired network resource according to their own requirements.

It should be noted that, each of the preceding example method embodiments, for the purpose of brevity, are expressed as a combination of a series of operations, but those skilled in the art should understand that, the present disclosure is not limited by the sequence of the described motions, as, according to the present disclosure, some operations may be executed in other sequences or at the same time. In addition, those skilled in the art should also understand that, the embodiments described in the specification are example embodiments, and the involved operations and modules may not be necessary for the present disclosure.

In the above example embodiments, the description of each embodiment has its own emphasis, and the portion that is not described in detail in a certain example embodiment may be known by referring to the relevant description of another example embodiments.

Figure 5:
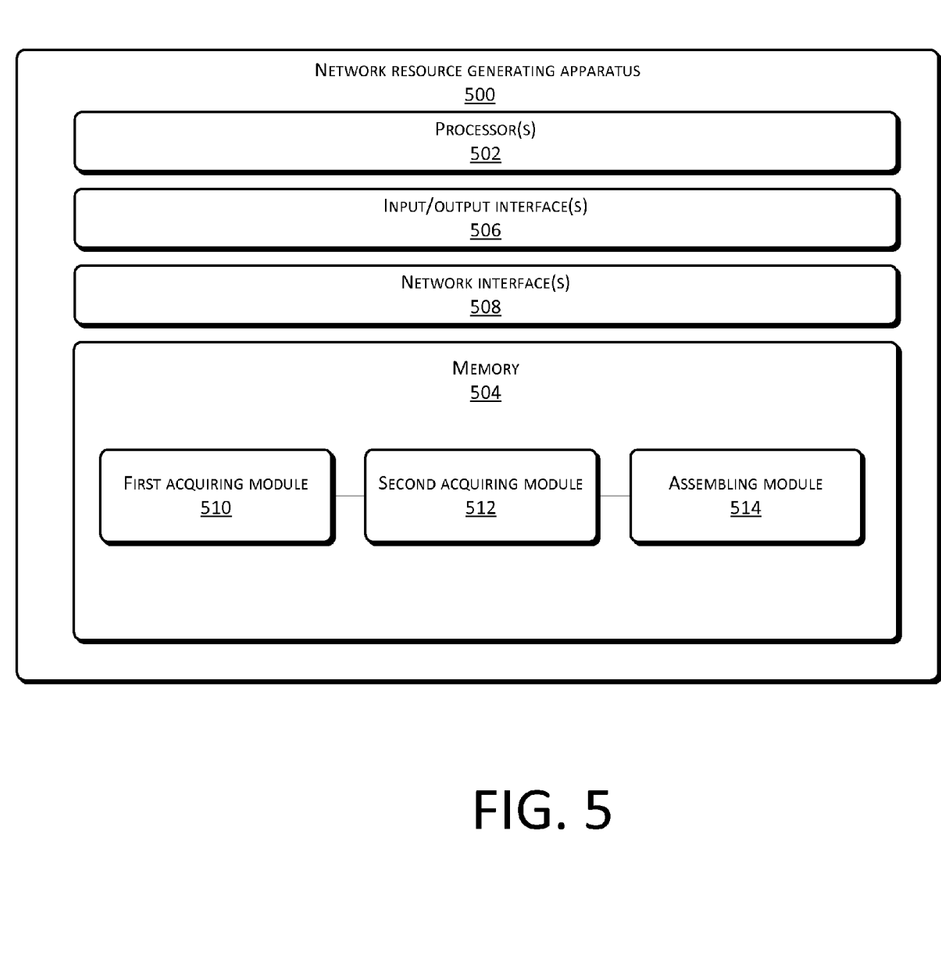
FIG. 5 is a schematic structure diagram of an example network resource generating apparatus according to an example embodiment of the present disclosure.

FIG. 5 is a schematic structure diagram of an example network resource generating apparatus 500 according to an embodiment of the present disclosure. As shown in FIG. 5, the network resource generating apparatus 500 may include one or more processor(s) 502 or data processing unit(s) and memory 504. The network resource generating apparatus 500 may further include one or more input/output interface(s) 506, and network interface(s) 508. The memory 504 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 504 may store therein a plurality of modules or units including a first acquiring module 510, a second acquiring module 512, and an assembling module 514.

The first acquiring module 510 acquires requirement description information of a user.

The second acquiring module 512, connected with the first acquiring module 510, acquires at least one resource component according to the requirement description information acquired by the first acquiring module 510. The resource component is a component that constitutes a network resource desired by the user, or a function component for realizing a part of functions of the network resource.

The assembling module 514, connected with the second acquiring module 512, assembles the network resource according the at least one resource component acquired by the second acquiring module 512.

Figure 6:
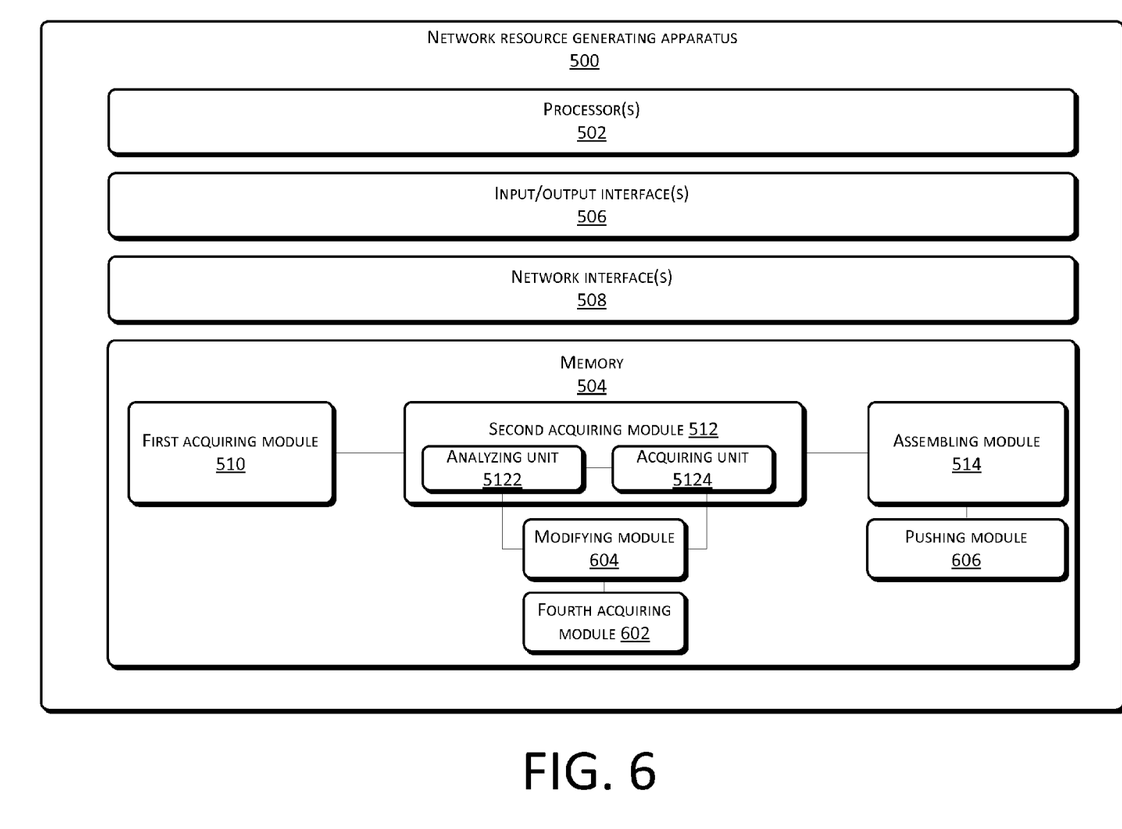
FIG. 6 is a schematic structure diagram of a network resource generating apparatus according to another embodiment of the present disclosure.

In an optional implementing, as shown in FIG. 6, one example implementing structure of the second acquiring module 512 includes an analyzing unit 5122 and an acquiring unit 5124.

The analyzing unit 5122 performs an analyzing process on requirement description information to obtain at least one piece component feature description information. The component feature description information describes the resource component that constitutes the network resource.

The acquiring unit 5124, connected with the analyzing unit 5122, acquires the at least one resource component matching the at least one piece component feature description information acquired by the analyzing unit 5122.

In an optional implementation, the acquiring unit 5124 performs matching in a component library according to the at least one piece component feature description information.

If each piece component feature description information in the at least one piece component feature description information is matched to a corresponding component element, the resource component corresponding to the component element, which corresponds to the each piece component feature description information, is acquired from the component library.

If component feature description information which is not matched to the corresponding component element exists among the at least one piece component feature description information, the requirement description information and/or the at least one piece component feature description information is sent to a resource generating platform so that the resource generating platform generates the at least one resource component according to the requirement description information and/or the at least one piece component feature description information, and the at least one resource component returned by the resource generating platform is received.

In an optional implementation, as shown in FIG. 6, the network resource generating apparatus 500 may further include a fourth acquiring module 602 and a modifying module 604 stored in memory 504.

The fourth acquiring module 602 acquires historical requirement information of the user according to identification information of the user before the acquiring unit 5124 acquires the resource component; and analyzes the historical requirement information of the user to obtain requirement preference information of the user with respect to the network resource. Accordingly, the modifying module 604, connected with the fourth acquiring module 602 and the analyzing unit 5122, modifies the at least one component feature description information acquired by the analyzing unit 5122 according to the requirement preference information acquired by the fourth acquiring module 602. Further, the modifying module 604, connected with the acquiring unit 5124, further provides the modified component feature description information to the acquiring unit 5124.

In an optional implementation, as shown in FIG. 6, the network resource generating apparatus 500 may further include a pushing module 606 stored in memory 504.

The pushing module 606, connected with the assembling module 514, pushes the network resource assembled by the assembling module 514 to the user.

Further, optionally, the pushing module 606, when the matching degree between features of the network resource and the requirement description information is greater than a preset matching degree threshold, pushes the network resource to the user.

The network resource generating apparatus provided in this example embodiment, by acquiring the requirement description information of the user, acquires the at least one resource component that constitutes or implements the network resource desired by the user according to the requirement description information, and assembles the network resource desired by the user according to the at least one resource component, achieves the objective of customizing the network resource for the user according to the user's requirement, so that the assembled network resource complies better with the user's requirement, and has a higher matching degree with the user's requirement, thereby better meeting the requirement of the user on the network resource.

It may be clearly understood by a person skilled in the art that, for the purpose of convenience and brevity, a detailed working process of the foregoing system, apparatus, and unit may refer to a corresponding process in the foregoing method embodiments, which is not detailed herein.

In the several example embodiments provided in the present disclosure, it should be understood that the disclosed system, apparatus, and method may be implemented in other manners. For example, the described apparatus embodiment is merely exemplary. For example, the unit division may be merely logical function division and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the example embodiments.

In addition, functional units in the example embodiments of the present disclosure may be integrated into one processing unit, or multiple processing units in which each of the units may exist alone physically or two or more units are integrated into one unit. The integrated unit may be implemented in a form of hardware, or may be implemented in a form of hardware and a software functional unit.

The integrated unit that is implemented in a form of a software functional unit may be stored in the computer-readable media. The software functional unit stored in the computer-readable media includes computer-executable instructions for instructing a computing device (which may be a personal computer, a server, or a network device) or a processor to perform part or all of the operations of the methods described in the example embodiments of the present disclosure. The computer-readable media includes any medium that is capable to store the computer-executable instructions, such as a USB flash drive, a removable hard disk, a Read-Only Memory (ROM), a Random Access Memory (RAM), a magnetic disk, or an optical disc, etc.

It should be noted that the above example embodiments merely illustrate, instead of limiting, the technical solutions of the present disclosure. Although the present disclosure is illustrated in detail with reference to the preceding example embodiments, a person of ordinary skill in the art should understand that amendments may be made to the technical solutions disclosed in the aforementioned embodiments or an equivalent replacement on partial technical features therein may also be made, without causing the essence of the corresponding technical solutions to depart from the spirit and principle of the example embodiments of the present disclosure.

What is claimed is:

1. A method comprising:
    acquiring requirement description information of a user;
    analyzing the requirement description information to obtain at least one component feature description information;
    acquiring historical requirement information of the user according to identification information of the user;
    analyzing the historical requirement information of the user to obtain requirement preference information of the user with respect to a network resource;
    modifying the at least one component feature description information according to the requirement preference information;
    acquiring at least one resource component matching the modified at least one component feature description information;
    determining whether piece component feature description information of the modified at least one component feature description information matches a component element in a component library; and
    improving a matching degree of the requirement description information with the network resource by:

upon determining that the piece component feature description information matches the component element in the component library, assembling the network resource according to the at least one resource component; or upon determining that the piece component feature description information does not match the component element in the component library, sending the piece component feature description information to a resource generating platform to acquire a different resource component according to the piece component feature description information, and assembling the network resource according to the different resource component returned by the resource generating platform.

2. The method of claim 1, wherein the at least one resource component is a component that constitutes the network resource.

3. The method of claim 1, wherein the at least one resource component is a function component for realizing a part of functions of the network resource.

4. The method of claim 1, wherein the modified at least one component feature description information describes the at least one resource component that constitutes the network resource.

5. The method of claim 1, wherein the acquiring the at least one resource component matching the modified at least one component feature description information includes:

matching the modified at least one component feature description information with a plurality of component elements in the component library; and acquiring one or more component elements corresponding to each component feature description information from the component library, in response to determining that each of the modified at least one component feature description information matches a corresponding component element.

6. The method of claim 1, wherein acquiring the at least one resource component matching the modified at least one component feature description information includes:

matching the modified at least one component feature description information with a plurality of component elements in the component library.

7. The method of claim 1, further comprising pushing the network resource to the user.

8. The method of claim 7, wherein the pushing the network resource to the user includes:

pushing the network resource to the user, in response to determining that a matching degree between one or more features of the network resource and the requirement description information is greater than a preset matching degree threshold.

9. An apparatus comprising:
one or more processors; and
memory coupled to the one or more processors, the memory storing computer-readable instructions executable by the one or more processors, the computer-readable instructions including a plurality of executable modules, the plurality of executable modules comprising:

a first acquiring module configured to acquire requirement description information of a user;

a second acquiring module configured to acquire at least one resource component according to the requirement description information, the second acquiring module including:

an analyzing unit configured to analyze the requirement description information to obtain at least one component feature description information, and a fourth acquiring module configured to:
acquire historical requirement information of the user according to identification information of the user, and
analyze the historical requirement information of the user to obtain requirement preference information of the user with respect to a network resource;

a modifying module configured to modify the at least one component feature description information according to the requirement preference information;

wherein the second acquiring module further includes an acquiring unit for improving a matching degree of the requirement description information with the network resource, the acquiring unit configured to acquire the at least one resource component matching the modified at least one component feature description information, the acquiring unit further configured to:

match the modified at least one component feature description information with a component element in a component library;

send the requirement description information and a piece component feature description information to a resource generating platform to generate the at least one resource component according to the requirement description information or the piece component feature description information, in response to determining that the piece component feature description information of the modified at least one component feature description information does not match a corresponding component element, and receive the at least one resource component returned by the resource generating platform; and an assembling module configured to assemble the network resource according to the at least one resource component.

10. The apparatus of claim 9, wherein the at least one resource component is a component that constitutes the network resource or a function component for realizing a part of functions of the network resource.

11. The apparatus of claim 9, wherein the component feature description information describes the resource component that constitutes the network resource.

12. The apparatus of claim 9, wherein the acquiring unit is further configured to:

match the modified at least one component feature description information with a plurality of component elements in the component library; and acquire one or more component elements corresponding to each component feature description information from the component library, in response to determining that each of the modified at least one component feature description information matches a corresponding component element.

13. The apparatus of claim 9, wherein the acquiring unit is further configured to match the modified at least one component feature description information with a plurality of component elements in the component library.

14. The apparatus of claim 9, wherein the plurality of executable modules further comprise a pushing module configured to push the network resource to the user.

15. The apparatus of claim 14, wherein the pushing module is configured to push the network resource to the user, in response to determining that a matching degree between one or more features of the network resource and the requirement description information is greater than a preset matching degree threshold.

16. One or more memories having stored thereon computer-executable instructions that are executable by one or more processors to perform operations comprising:
acquiring requirement description information of a user;
analyzing the requirement description information to obtain at least one component feature description information;
acquiring historical requirement information of the user according to identification information of the user;
analyzing the historical requirement information of the user to obtain requirement preference information of the user with respect to a network resource;
modifying the at least one component feature description information according to the requirement preference information;
acquiring at least one resource component matching the modified at least one component feature description information;
determining whether piece component feature description information of the modified at least one component feature description information matches a component element in a component library; and
improving a matching degree of the requirement description information with the network resource by:
upon determining that the piece component feature description information matches the component element in the component library, assembling the network resource according to the at least one resource component; or
upon determining that the piece component feature description information does not match the component element in the component library,
sending the piece component feature description information to a resource generating platform to acquire a different resource component according to the piece component feature description information, and
assembling the network resource according to the different resource component returned by the resource generating platform.

17. The one or more memories of claim 16, wherein the at least one resource component is one of:
a component that constitutes the network resource, or
a function component for realizing a part of functions of the network resource.

18. The one or more memories of claim 16, wherein the modified at least one component feature description information describes the at least one resource component that constitutes the network resource.

19. The one or more memories of claim 16, wherein the acquiring the at least one resource component matching the modified at least one component feature description information includes:
matching the modified at least one component feature description information with a plurality of component elements in the component library; and
acquiring one or more component elements corresponding to each component feature description information from the component library, in response to determining that each of the modified at least one component feature description information matches a corresponding component element.

20. The one or more memories of claim 16, wherein acquiring the at least one resource component matching the modified at least one component feature description information includes:
matching the modified at least one component feature description information with a plurality of component elements in the component library.

* * * * *